US008881278B2

(12) United States Patent
Kaplan et al.

(10) Patent No.: US 8,881,278 B2
(45) Date of Patent: Nov. 4, 2014

(54) SYSTEM AND METHOD FOR DETECTING MALICIOUS CONTENT

(75) Inventors: Mark Kaplan, Modiin (IL); Alexander Friger, Beer Sheva (IL); Peter Novikov, Bat Yam (IL)

(73) Assignee: Trustwave Holdings, Inc., Chicago, IL (US)

( * ) Notice: Subject to any disclaimer, the term of this patent is extended or adjusted under 35 U.S.C. 154(b) by 139 days.

(21) Appl. No.: 13/158,106

(22) Filed: Jun. 10, 2011

(65) Prior Publication Data

US 2011/0307955 A1 Dec. 15, 2011

Related U.S. Application Data

(60) Provisional application No. 61/353,957, filed on Jun. 11, 2010.

(51) Int. Cl.
*G06F 11/00* (2006.01)
*H04L 29/06* (2006.01)
*G06F 21/55* (2013.01)

(52) U.S. Cl.
CPC .......... *G06F 21/554* (2013.01); *H04L 63/0227* (2013.01); *H04L 63/168* (2013.01)
USPC ............................................. 726/23; 726/24

(58) Field of Classification Search
CPC .............. H04L 63/168; H04L 63/0227; H04L 63/1408; H04L 63/1441; H04L 63/1416; G06F 21/51; G06F 21/563
USPC .......................................................... 726/23
See application file for complete search history.

(56) References Cited

U.S. PATENT DOCUMENTS

| 6,092,194 | A | 7/2000 | Touboul |
| 6,154,844 | A | 11/2000 | Touboul et al. |
| 6,804,780 | B1 | 10/2004 | Touboul |

(Continued)

FOREIGN PATENT DOCUMENTS

| CA | 2578792 | 3/2006 |
| EP | 0965094 | 12/1999 |

(Continued)

OTHER PUBLICATIONS

AdSafe, Making JavaScript Safe for Advertising, http://www.adsafe.org, retrieved Sep. 20, 2011, 4 pgs.

(Continued)

*Primary Examiner* — Kambiz Zand
*Assistant Examiner* — Ghodrat Jamshidi
(74) *Attorney, Agent, or Firm* — Hanley, Flight and Zimmerman, LLC (57) ABSTRACT

A system and method for detecting malicious code in web content is described. A controller receives information, routes the information to the appropriate module and determines whether a user receives the web content or a report of a detection of malicious code. A vulnerability definition generator generates vulnerability definitions. A parser parses web content into static language constructions. A translation engine translates the static language constructions into trap rules, translates the web content into application programming interface (API) calls and determines whether the API calls trigger any of the trap rules. A sandbox engine generates an environment that mimics a browser and executes dynamic parts of the web content and determines whether a dynamic part triggers a trap rule.

19 Claims, 6 Drawing Sheets

(56) References Cited

U.S. PATENT DOCUMENTS

| | | | |
|---|---|---|---|
| 7,284,274 B1 | 10/2007 | Walls et al. | |
| 7,392,541 B2 | 6/2008 | Largman et al. | |
| 7,613,926 B2 | 11/2009 | Edery et al. | |
| 7,624,449 B1 | 11/2009 | Perriot | |
| 7,647,633 B2 | 1/2010 | Edery et al. | |
| 7,721,333 B2 | 5/2010 | Horne | |
| 7,823,201 B1 | 10/2010 | Xu | |
| 7,849,509 B2 | 12/2010 | Venkatapathy et al. | |
| 7,975,305 B2 | 7/2011 | Rubin et al. | |
| 8,074,281 B2 | 12/2011 | Peinado et al. | |
| 8,079,086 B1 | 12/2011 | Edery et al. | |
| 8,117,531 B1* | 2/2012 | Lueck | 715/204 |
| 8,225,408 B2 | 7/2012 | Rubin et al. | |
| 8,407,790 B2* | 3/2013 | Mony | 726/22 |
| 8,464,341 B2 | 6/2013 | Cohen | |
| 2002/0095660 A1 | 7/2002 | O'Brien et al. | |
| 2003/0023873 A1 | 1/2003 | Ben-Itzhak | |
| 2003/0056199 A1 | 3/2003 | Li et al. | |
| 2003/0065926 A1 | 4/2003 | Schultz et al. | |
| 2003/0084063 A1 | 5/2003 | DelMonaco et al. | |
| 2004/0078784 A1 | 4/2004 | Bates et al. | |
| 2005/0108554 A1 | 5/2005 | Rubin et al. | |
| 2005/0138413 A1 | 6/2005 | Lippmann et al. | |
| 2005/0193380 A1* | 9/2005 | Vitanov et al. | 717/143 |
| 2006/0161980 A1 | 7/2006 | Huitema et al. | |
| 2006/0190606 A1 | 8/2006 | Kohavi | |
| 2007/0113282 A1* | 5/2007 | Ross | 726/22 |
| 2007/0143851 A1 | 6/2007 | Nicodemus et al. | |
| 2007/0250930 A1 | 10/2007 | Aziz et al. | |
| 2007/0277163 A1 | 11/2007 | Avresky | |
| 2008/0016339 A1* | 1/2008 | Shukla | 713/164 |
| 2008/0189086 A1 | 8/2008 | Ford et al. | |
| 2008/0216175 A1 | 9/2008 | Pike | |
| 2008/0301796 A1 | 12/2008 | Holostov et al. | |
| 2009/0019545 A1 | 1/2009 | Ben-Itzhak et al. | |
| 2009/0077091 A1 | 3/2009 | Khen et al. | |
| 2009/0282480 A1 | 11/2009 | Lee et al. | |
| 2009/0328210 A1 | 12/2009 | Khachaturov et al. | |
| 2011/0093773 A1* | 4/2011 | Yee | 715/235 |
| 2011/0179347 A1 | 7/2011 | Proctor et al. | |
| 2011/0307951 A1 | 12/2011 | Yermakov et al. | |
| 2011/0307954 A1 | 12/2011 | Melnik et al. | |
| 2011/0307956 A1 | 12/2011 | Yermakov et al. | |
| 2012/0117651 A1 | 5/2012 | Edery et al. | |

FOREIGN PATENT DOCUMENTS

| | | |
|---|---|---|
| EP | 1810152 | 7/2007 |
| WO | 9821683 | 5/1998 |
| WO | 9935583 | 7/1999 |
| WO | 2006025050 | 3/2006 |

OTHER PUBLICATIONS

Code Coverage Meter, http://www.coveragemeter.com/codecoverage.html, retrieved Feb. 13, 2012, 11 pgs.

Erickson, MashupOS: Can You Have Security and Web 2.0?, Dr. Dobb's Bloggers, Apr. 23, 2008, 4 pgs.

FBJS (Facebook JavaScript)—Facebook Developers, http://www.developers.facebook.com/docs/fbjs, retrieved Feb. 13, 2012, 17 pgs.

Google-caja, http://code.google.com/p/google-caja/, retrieved Sep. 20, 2011, 6 pgs.

Grune et al., Modern Compiler Design, First Edition, VU University Amsterdam, Amsterdam, The Netherlands, John Wiley & Sons, Ltd., 2000, ISBN 0471976970, 753 pgs.

Hayhurst et al., A Practical Tutorial on Modified Condition/Decision Coverage, NASA/TM-2001-210876, National Aeronautics and Space Administration, Langley Research Center, Hampton, VA, May 2001, 85 pgs.

Ho et al., Practical Taint-Based Protection using Demand Emulation, EuroSys 2006, pp. 29-41.

Howell et al., MashupOS: Operating System Abstractions for Client Mashups, 7 pgs.

International Search Report, International Application No. PCT/US2011/39869, Oct. 13, 2011, 8 pgs.

International Search Report, International Application No. PCT/US2011/39927, Sep. 29, 2011, 7 pgs.

International Search Report, International Application No. PCT/US2011/40040, Oct. 13, 2011, 16 pgs.

JavaScript The Definitive Guide, Chapter 20 JavaScript Security, 20.4 The Data-Tainting Security Model, docstore.mik.ua/orelly/web/jscript/ch20__04.html, retrieved Jan. 13, 2012, 5 pgs.

JSCoverage, Code Coverage for JavaScript, http://siliconforks.com/jscoverage/, retrieved Sep. 2, 2011, 2 pgs.

Livshits et al., Spectator: Detection and Containment of JavaScript Worms, 27 pgs.

Microsoft-Research, Gatekeeper, http://research.microsoft.com/en-us/projects/gatekeeper/, retrieved Sep. 20, 2011, 1 pg.

Microsoft-Research, Nozzle & Zozzle: JavaScript Malware Detection, http://research.microsoft.com/en-us/projects/nozzle/, retrieved Sep. 20, 2011, 2 pgs.

Microsoft WebSandbox Technology Preview, http://websandbox.livelabs.com/, retrieved Sep. 20, 2011, 6 pgs.

Nair et al., A Virtual Machine Based Information Flow Control System for Policy Enforcement, Department of Computer Science, Vrije Universiteit, Amsterdam, The Netherlands, Electronic Notes in Theoretical Computer Science 197, 2008, 14 pgs.

JavaScript Security, Chapter 14 JavaScript Security, http://devedge-temp.mozilla.org/library/manuals/2000/javascript/1.3/guide/sec.html#1021266, retrieved Sep. 20, 2011, 19 pgs.

Perlsec—perldoc.perl.org, retrieved Jan. 13, 2012, 11 pgs.

Reis et al., Usenix, BrowserShield: Vulnerability-Driven Filtering of Dynamic HTML, OSDI '06 Paper, http://www.usenix.org/events/osdi06/tech/full__papers/reis/reis__html/index.html, retrieved Sep. 20, 2011, 24 pgs.

W3C, The World Wide Web Security FAQ, CGI (Server) Scripts, www.w3.org/Security/Faq/wwwsf4.html#CGI-Q15, retrieved Jan. 13, 2012, 17 pgs.

Wang et al., The Multi-Principal OS Construction of the Gazelle Web Browser, MSR Technical Report MSR-TR-2009-16, 20 pgs.

"Blink Total Protection, Multi-Layered Endpoint Protection Platform," 2011, 2 pages, eEye Digital Security.

Gerard M. Davison, "Convert Dynamic to Static Construction," www.refactoring.com/catalog/convertDynamicToStaticConstruction.html, retrieved from the internet on Aug. 9, 2013, 4 pages.

United States Patent and Trademark Office, "Non-Final Office Action," issued in connection with U.S. Appl. No. 13/155,179, Mar. 29, 2013, 32 pages.

Patent Cooperation Treaty, "International Preliminary Report on Patentability," issued in connection with Application No. PCT/US2011/039869, Dec. 27, 2012, 5 pages.

Patent Cooperation Treaty, "International Preliminary Report on Patentability," issued in connection with Application No. PCT/US2011/040040, Dec. 27, 2012, 7 pages.

Patent Cooperation Treaty, "International Preliminary Report on Patentability," issued in connection with Application No. PCT/US2011/039927, Dec. 27, 2012, 6 pages.

United States Patent and Trademark Office, "Final Office action", issued in connection with U.S. Appl. No. 13/155,179, mailed on Nov. 13, 2013, 43 pages.

United States Patent and Trademark Office, "Notice of Allowance", issued in connection with U.S. Appl. No. 13/155,179, mailed on Mar. 13, 2014, 48 pages.

United States Patent and Trademark Office, "Non-Final Office action", issued in connection with U.S. Appl. No. 13/156,971, mailed on Mar. 18, 2014, 35 pages.

United States Patent and Trademark Office, "Non-Final Office action", issued in connection with U.S. Appl. No. 13/156,952, mailed on Jan. 22, 2014, 30 pages.

* cited by examiner

SYSTEM AND METHOD FOR DETECTING MALICIOUS CONTENT

CROSS-REFERENCE TO RELATED APPLICATIONS

The present application claims priority under 35 U.S.C. §119(e) to U.S. Provisional Patent Application No. 61/353,957, filed on Jun. 11, 2010, entitled "Method and System for Detecting Malicious Content" which is herein incorporated by reference in its entirety.

BACKGROUND

This invention generally relates to detecting malicious content. More particularly, the invention relates to improving detection of malicious content by using a content scanner.

A typical web page for viewing by a browser is no longer a simple static "hypertext page." Instead the web page is for engaging dynamic functionality of the browser. The dynamic functionality of the browser allows for interactive and animated websites. For example, typical web pages employ the dynamic nature of JavaScript/Visual Basic Script (VBScript), Asynchronous JavaScript And XML (AJAX) and JavaScript Object Notation (JSON)-like functionality of out-of-band data and code updates, eXtensible Markup Language (XML) to HyperText Markup Language (HTML) data binding and modern features of Cascading Style Sheets (CSS). Rising generations of rich internet applications running in Adobe Flash, Adobe Integrated Runtime (AIR), MS Silverlight, Novell Moonlight, Adobe Portable Document Format (PDF) and Sun JavaFX sandboxes dramatically leverage the power of well-known and seasoned Java Applets and ActiveX technologies by providing to a web developer a rich set of application programming interfaces (APIs). The dynamic functionality of the browser opens numerous possibilities for malicious code to exploit the browser and other applications at runtime.

Network security content scanners are inherently limited in their ability to find malicious code because they are designed to search for static heuristic patterns inside of the code. For example, content scanners try to search for exploitation method fingerprints, which tend to generate a high level of false positives while retaining a neglectful level of false negatives due to the endless variety of ways to encode malicious exploit code for the same vulnerabilities. Another problem with content scanners is that dynamic natural languages and obfuscated code usage make it difficult to determine whether an embedded script will exploit the browser or other application at run-time. Yet another problem with content scanners is that they analyze web document parts (e.g. HTML with embedded JavaScript or VBScript) independently. As a result, the content scanner cannot detect combined exploits.

SUMMARY OF THE INVENTION

Embodiments of the present invention provide a system and method for improving detection of malicious content using a content scanner. In one embodiment, the content scanner includes a controller, a vulnerability definition generator, a parser, a translation engine, a fetcher, a sandbox engine, a graphical user interface engine and a communication unit. The controller is software including routines for receiving information and routing the information to the appropriate module. The vulnerability definition generator generates vulnerability definitions that are stored in the memory. The parser is a content-dependent parser that parses web documents using a separate parser for each type of code. The translation engine translates vulnerability definitions into trap rules. In addition, the translation engine translates the parsed web documents into API calls and determines whether the API calls trigger any trap rules.

The sandbox engine loads vulnerability definitions and trap rules for intercepting malicious code. Depending upon the type of web content being analyzed, the fetcher fetches external resources including different code files. The sandbox engine creates an environment similar to the one existing in the client web application by extracting metadata information provided by the network protocol. The sandbox engine extracts dynamic parts of the web page and executes them in the relevant type of virtual machine sandbox. This creates a live construction that mimics browser or other application behavior. The virtual machine sandbox detects malicious code when the code executed in the virtual machine sandbox triggers pre-defined traps.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

A method and system for improving detection of malicious content using a content scanner is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

Figure 1:
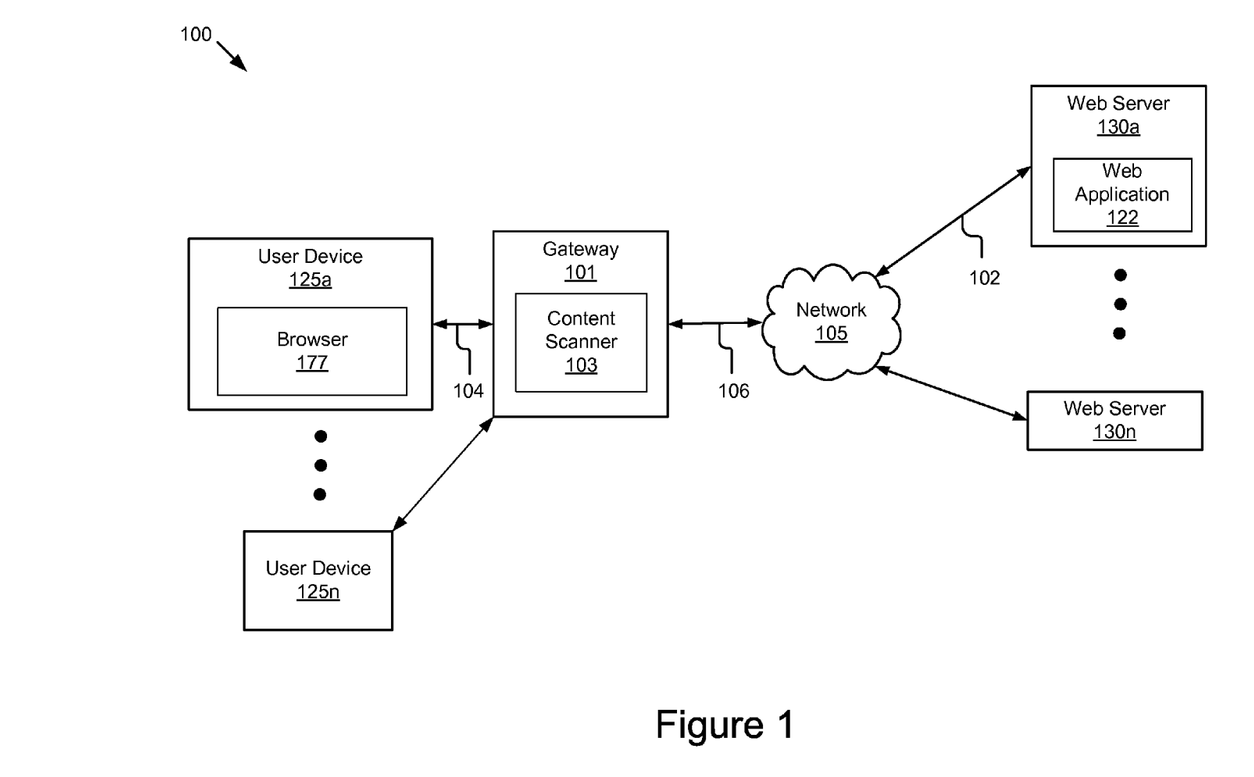
FIG. 1 is a block diagram of a system for using a content scanner to improve the detection of malicious code according to an embodiment of the invention.

FIG. 1 illustrates a block diagram of a system 100 for improving detection of malicious code using a content scanner according to an embodiment of the invention. The system 100 for improving detection of malicious code using a content scanner includes one or more user devices 125a-n, a gateway 101 and one or more web servers 130a-n. These entities are communicatively coupled via a network 105.

The user devices 125a-n in FIG. 1 are used by way of example. User devices 125a-n are computing devices having data processing and communication capabilities. For example, user device 125a comprises a desktop computer, a laptop computer, a netbook computer, a tablet computer, a smartphone or an internet capable television. While FIG. 1 illustrates two user devices, the specification applies to any system architecture having any number of user devices 125n. Furthermore, while only one network 105 is coupled to the user devices 125a-n, gateway 101 and web servers 130a-n, in practice any number of networks 105 can be connected to the entities.

User devices 125a-n execute instructions or data using a processor to store, retrieve, modify or otherwise access data. When executing one or more processes, the client devices 125a-n access data, such as web content, from a remote source, such as web servers 130a-n. Before the web content reaches the user device 125a, however, the gateway 101 scans the web content for malicious code. The user device 125a is coupled to the gateway 101 via signal line 104. To access remote data, the user devices 125a-n send requests for web content to web servers 130a-n.

The user devices 125a-n include a browser 177. In one embodiment, the browser 177 is code and routines stored in a memory and executed by a processor of the user device 125a-n. For example, the browser 177 is a browser application such as Google Chrome, Firefox or Internet Explorer. In one embodiment, the browser 177 comprises a memory for storing data. Malicious code attempts to access the user device 125a-n through the browser during runtime. Although a browser 177 is illustrated for the user device 125a, persons of ordinary skill in the art will recognize that the invention can be practiced with regard to other applications that render web content as well.

The gateway 101 is a computing device that couples user devices 125a-n to the network 105. For example, the gateway 101 is a router, a wireless access point, a network switch or any other suitable type of computing device. Gateway 101 is coupled to the network 105 via signal line 106. In one embodiment, the user device 125a is coupled to the gateway 101 using a local area network (LAN).

Gateway 101 intervenes between requests, from user devices 125a-n for web content and responses originating from web servers 130a-n. Gateway 101 includes a content scanner 103 for analyzing incoming web content in order to detect the presence of malicious executable scripts or active code. Gateway 101 analyzes incoming web content from web servers 130a-n and determines whether the web content executes malicious code. While FIG. 1 shows the gateway 101 as a separate component, in some embodiments the gateway 101 is included as part of the user devices 125a-n.

Web servers 130a-n are computing devices having data processing and communication capabilities. Web server 130a is coupled to network 105 via signal line 102. The web servers 130a-n receive requests from user devices 125a-n for web content and transmit responses including web content to the user devices 125a-n. In one embodiment, the web content, including any malicious content, is generated by a web application 122. Web content includes text, executable scripts and web objects. Web objects include images, sounds, multimedia presentations, video clips and also executable scripts and active code that run on user devices 125a-n. Executable scripts and active code components are a security concern, since they may include malicious code that harms user devices 125a-n.

The network 105 is a conventional network and may have any number of configurations such as a star configuration, a token ring configuration or another configuration known to those skilled in the art. In various embodiments, the network 105 is a wireless network, a wired network or a combination of a wireless and a wired network. Furthermore, the network 105 may be a local area network (LAN), a wide area network (WAN) (e.g., the Internet) and/or any other interconnected data path across which multiple devices may communicate. In yet another embodiment, the network 105 may be a peer-to-peer network.

The network 105 may also be coupled to, or include, portions of a telecommunications network for communicating data using a variety of different communication protocols. In yet another embodiment, the network 105 includes a Bluetooth communication network and/or a cellular communications network for sending and receiving data. For example, the network 105 transmits and/or receives data using one or more communication protocols such as short messaging service (SMS), multimedia messaging service (MMS), hypertext transfer protocol (HTTP), direct data connection, WAP, email or another suitable communication protocol.

Content Scanner 103

Figure 2:
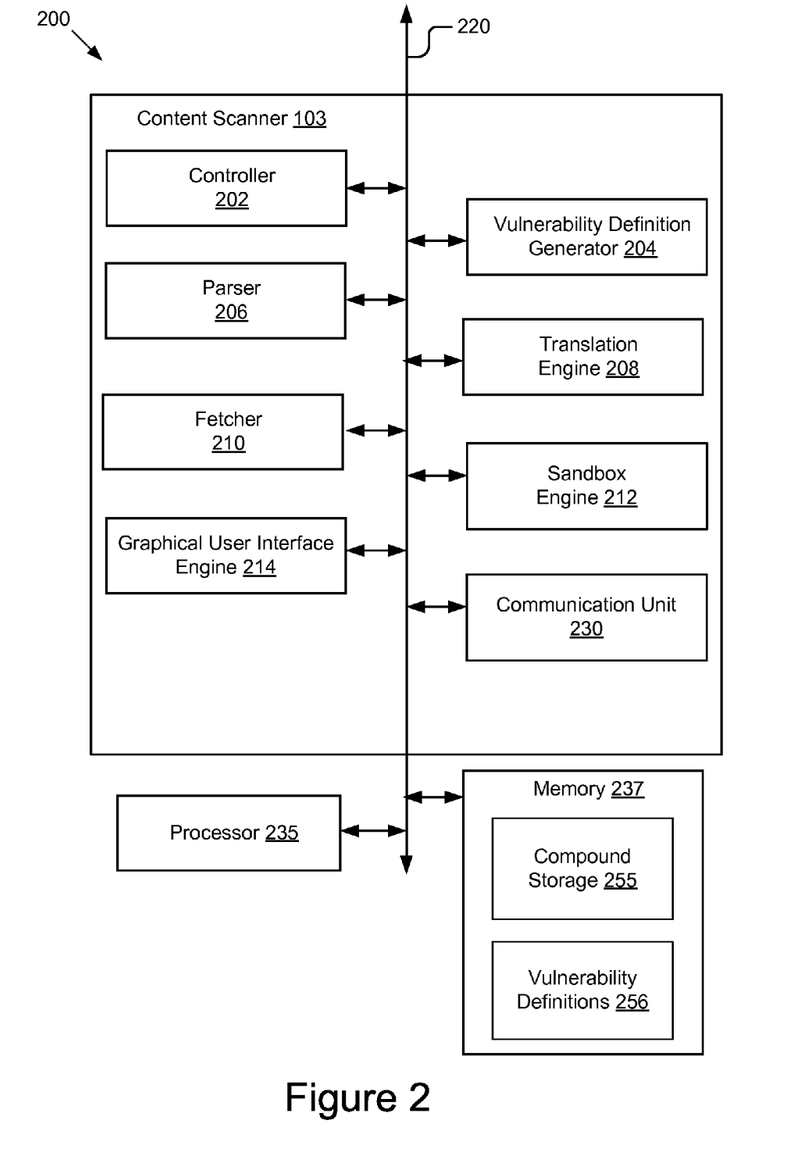
FIG. 2 is a block diagram of a content scanner according to an embodiment of the invention.

FIG. 2 illustrates the content scanner 103 in more detail. FIG. 2 is a block diagram of a computing device 200 that includes the content scanner 103, a processor 235 and memory 237. In one embodiment, the computing device 200 is a gateway 101. In another embodiment, the computing device 200 is a user device 125a.

The processor 235 comprises an arithmetic logic unit, a microprocessor, a general purpose controller or some other processor array to perform computations and provide electronic display signals to a display device. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. In one embodiment, the memory 237 includes compound storage 255 and vulnerability definitions 256. Compound storage 255 is a hierarchical database that stores metadata relating to the sandbox and web page data. The vulnerability definitions 256 are definitions determined by the vulnerability definition generator 204.

In one embodiment, the content scanner 103 comprises a controller 202, a vulnerability definition generator 204, a parser 206, a translation engine 208, a fetcher 210, a sandbox engine 212, a graphical user interface engine 214 and a communication unit 230, each of which are communicatively coupled to the bus 220.

The controller 202 is software including routines for receiving information and routing the information to the appropriate module. In one embodiment, the controller 202 is a set of instructions executable by processor 235 to provide the functionality described below for improving detection of malicious code. In another embodiment, the controller 202 is stored in the memory 237 of computing device 200 and is accessible and executable by processor 235. In either embodiment, the controller 202 is adapted for cooperation and communication with the processor 235, the memory 237, the vulnerability definition generator 204, the parser 206, the translation engine 208, the fetcher 210, the sandbox engine 212, the graphical user interface engine 214 and the communication unit 230 via the bus 220.

In one embodiment, the controller 202 receives a request from a user device 125a for web content provided by a web server 130a. The controller 202 transmits the request to the communication unit 230, which transmits the request to the web server 130a. In another embodiment, outgoing requests from the user device 125a are transmitted directly to the web server 103a. In either case, the web server 130a receives the request and responds by sending a response including the web content to the communication unit 230, which transmits the response to the controller 202. The controller 202 initiates a process for analyzing the web content for malicious code before sending the response to user device 125a. If the controller 202 receives a determination that malicious code related to the web content was detected, the controller 202 performs an action to prevent the malicious code from running on the user device 125a. In one embodiment, the action includes quarantining the content or modifying the malicious code.

The vulnerability definition generator 204 is software including routines for receiving information about products and malware, identifying conditions that cause products to crash and generating vulnerability definitions. The controller 202 stores the vulnerability definitions 256 in the memory 237. In one embodiment, the information includes data derived from the security community. In another embodiment, the vulnerability definition generator 204 is a set of instructions executable by processor 235 to receive software and attempt to expose vulnerabilities in the software. In either embodiment, the vulnerability definition generator 204 is adapted for cooperation and communication with the processor 235, the memory 237, the controller 202, the translation engine 208 and the sandbox engine 212 via the bus 220.

The parser 206 is software including routines for parsing static language for each type of computer language included in web content, such as a web page. In one embodiment, the parser 206 is a set of instructions executable by processor 235 to separately parse each type of content to generate static language constructions. In either embodiment, the parser 206 is adapted for cooperation and communication with the processor 235, the memory 237, controller 202 and the translation engine 208 via the bus 220.

Figure 3:
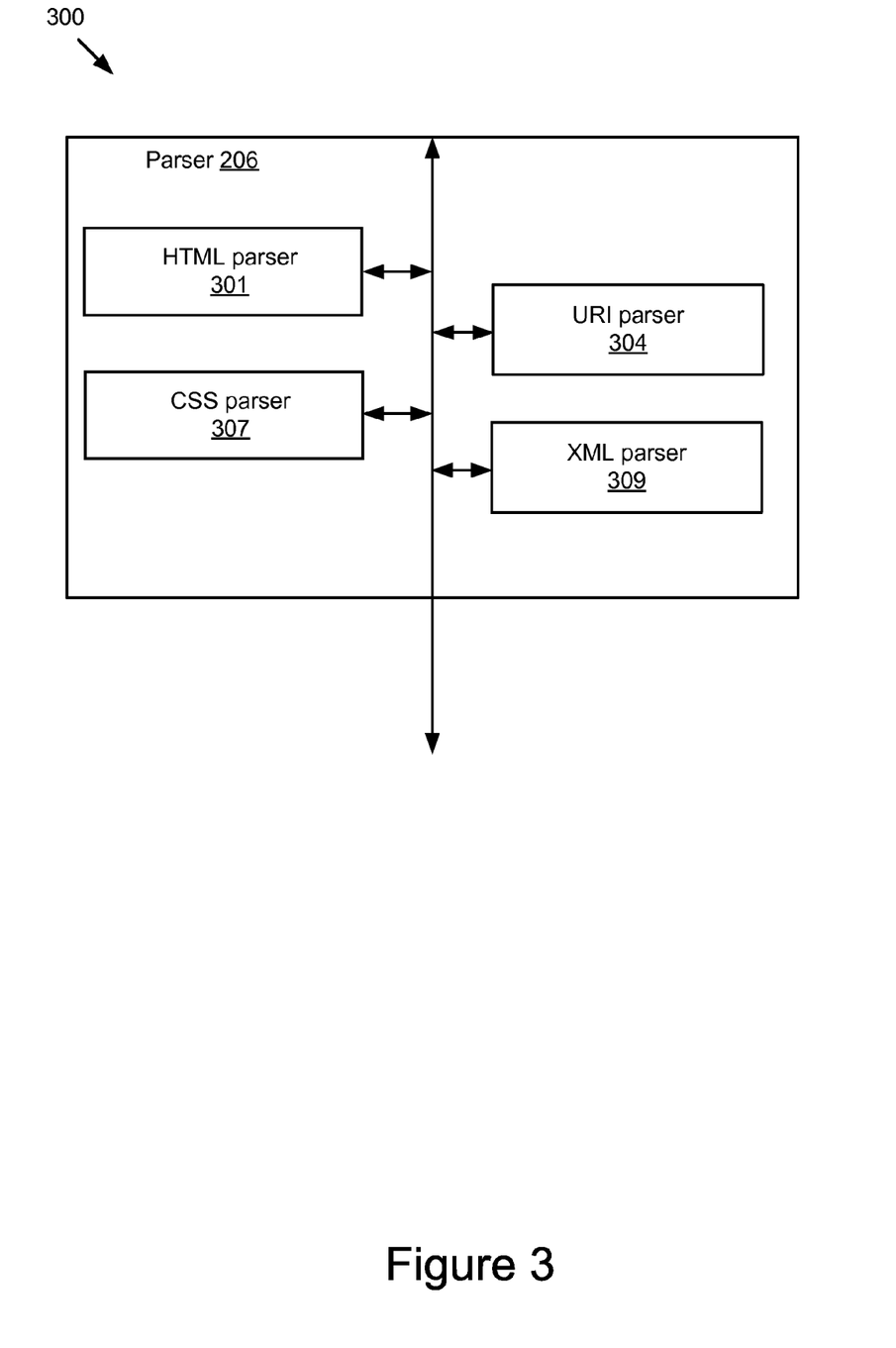
FIG. 3 is a block diagram of a parser according to an embodiment of the invention.

Turning now to FIG. 3, one example of a parser 206 is illustrated. In this example, the parser 206 comprises a HyperText Markup Language (HTML) parser 301 for parsing HTML, a uniform resource indicator (URI) parser 304 for parsing the URI to identify the name or resource, a cascading style sheet (CSS) parser 307 for parsing the markup language used to create the web content and an eXtensible Markup Language (XML) parser 309. Each of the parsers are coupled to the bus 220. Persons of ordinary skill in the art will recognize that other embodiments of the parser 206 include parsers for other types of content not included in FIG. 3.

Turning back to FIG. 2, the translation engine 208 is software including routines for translating the vulnerability definitions 256 into traps and translating the parsed static language constructions into a sequence of application programming interface (API) calls. The API is a set of rules that allow a software program to communicate with other software programs. A call is a request to perform a function. Thus, an API call is a request from the API to access information from another program. For example, when a browser 177 on a user device renders web content, the API can call the user device's 125a resources to aid in displaying the web content. If the web content is malicious, in one example the API call includes a request to a temporary file system so that the web content can tamper with important files.

In one embodiment, the translation engine 208 translates a static HTML construction into HTML document object model (DOM) calls. DOM is a language-independent convention for representing all objects and properties in a markup language, such as HTML, eXtensible HTML (XHTML) and eXtensible Markup Language (XML) documents. Put simply, in one embodiment the translation engine 208 is a set of instructions executable by processor 235 to translate static constructions like HTML, CSS, URI and XML into dynamic parts of executable code, which interacts with the same HTML DOM. The translation engine 208 determines whether the API call triggers a trap rule. If no malicious code is detected, the controller 202 allows the web content to be transmitted to the user device 125a. In either embodiment, the translation engine 208 is adapted for cooperation and communication with the processor 235, the memory 237 and the controller 202 via the bus 220.

The fetcher 210 is software including routines for fetching external resources for rendering web content. For example, HTML will frequently refer to data that is located remotely, such as embedded JavaScript. In one embodiment, the fetcher 210 is a set of instructions executable by processor 235 to fetch JavaScript files, CSS files, HTML part files and resources in other languages that a person of ordinary skill in the art would recognize to be part of the web content. The external resources are used in conjunction with the sandbox engine 212 to properly simulate a live construction so that all possible mechanisms for triggering a trap rule occur. In either embodiment, the fetcher 210 is adapted for cooperation and communication with the processor 235, the memory 237, controller 202 and the sandbox engine 212 via the bus 220.

The sandbox engine 212 is software including routines for extracting metadata from the network protocol and executing the dynamic parts of the web page in the appropriate type of sandbox. In one embodiment, the sandbox engine 212 is a set of instructions executable by processor 235 for mimicking the browser 177 or another application that renders web content to identify code that triggers a trap. In either embodiment, the sandbox engine 212 is adapted for cooperation and communication with the processor 235, the memory 237, the fetcher 210 and the controller 202 via the bus 220.

Figure 4:
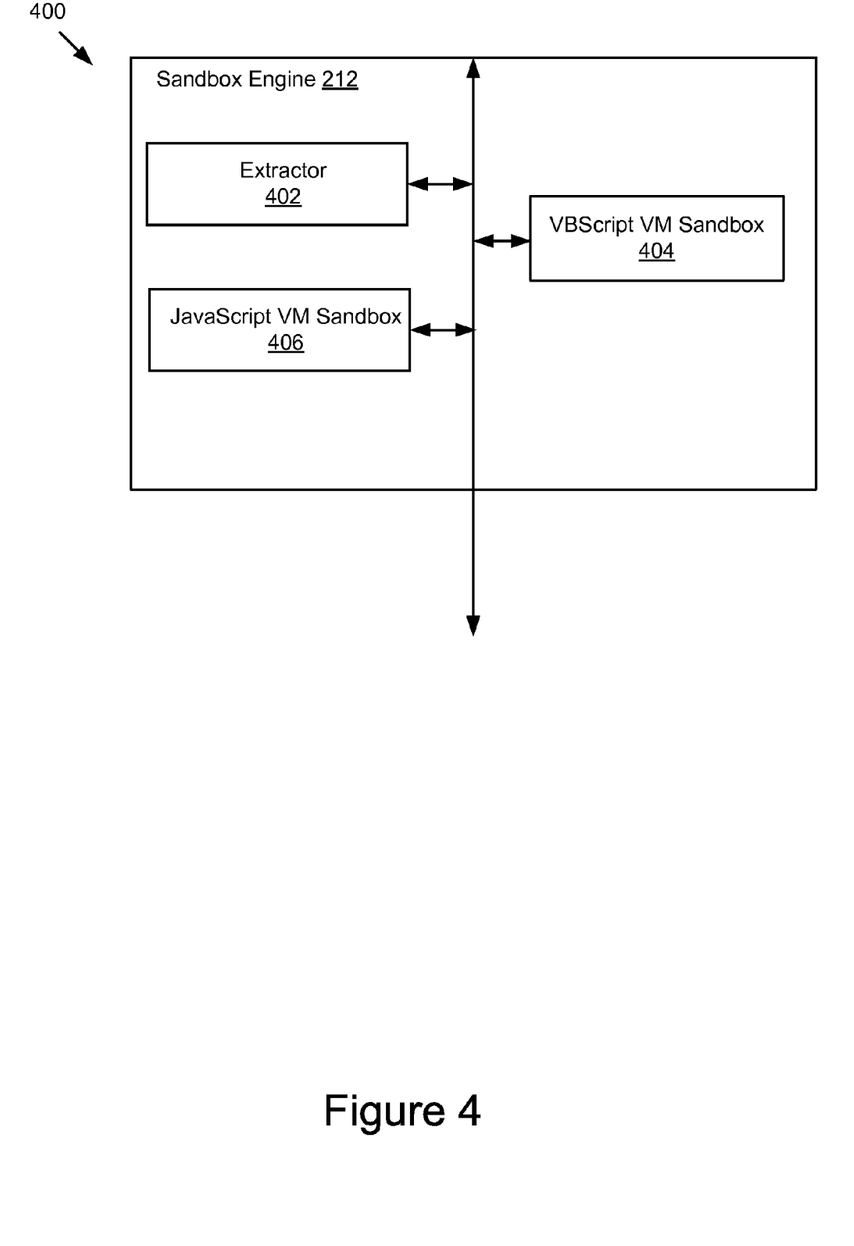
FIG. 4 is a block diagram of a sandbox engine according to an embodiment of the invention.

Turning now to FIG. 4, one embodiment of a sandbox engine 212 is illustrated. In this embodiment, the sandbox engine 212 comprises an extractor 402, a visual basic scripting (VBScript) virtual machine (VM) sandbox 404 and a JavaScript VM sandbox 406. Each of the sandboxes are coupled to the bus 220. While only JavaScript and Visual Basic Script are illustrated as examples of virtual machine sandboxes, persons of ordinary skill in the art will recognize that other language virtual machine sandboxes are possible. A virtual machine sandbox is an application that executes the code while preventing the code from harming the gateway 101, for example, by preventing the API calls from altering the storage files or from transmitting information about the gateway 101 to the web server 130a.

The extractor 402 extracts metadata information from a network protocol to determine parameters for creating an environment similar to one existing in the browser 177. For example, the controller 202 receives a hypertext transfer protocol (HTTP) request message for web content. The controller 202 transmits the message to the metadata extractor 402, which extracts the user-agent header from the message to determine the application type, version, etc. and saves the metadata in the compound storage 255. The extractor 402 also extracts dynamic parts of the web page and transmits them to the appropriate virtual machine sandbox for execution.

The JavaScript VM sandbox 406 and the VBScript VM sandbox 404 execute the appropriate dynamic parts and mimic the activity of a browser such as the browser 177 stored on the client device 125a. The sandboxes emulate browser-specific features such as dynamic HTML functionality and frameworks that support rich internet applications (RIA). Examples of dynamic HTML functionality include JavaScript, VBScript, AJAX, JSON, XML-to-HTML data binding and CSS. Examples of frameworks that support RIA include Adobe Flash, AIR, MS Silverlight, Novell Moonlight, Adobe PDF and Sun JavaFX. If the content does not trigger a trap rule, the controller 202 allows the content to be transmitted to the browser 177 for display.

Turning back to FIG. 2, the graphical user interface engine 214 is software including routines for generating a user interface for alerting the user of a detection of malicious code from analysis of the code. The detection arises either from the translated parsed static language construction or from the analysis of dynamic code in the sandboxes. In another embodiment, the graphical user interface engine 214 alerts the user that an analysis found no malicious code. In yet another embodiment, the graphical user interface engine 214 generates a user interface for displaying one or more options for handling detected malicious code. In another embodiment, the graphical user interface engine 214 receives a selected option from a user for handling detected malicious code. In any embodiment, the graphical user interface engine 214 is adapted for cooperation and communication with the processor 235, the memory 237 and the controller 202 via the bus 220.

The communication unit 230 receives web content from the web server 130a via the network 105 and transmits the web content to the controller 202 so that the content scanner 103 can determine whether the web content contains malicious code. The communication unit 230 transmits the web content to the user device 125a if the web content does not contain malicious code. If the web content does contain malicious code, in one embodiment the communication unit 230 transmits a notification generated by the graphical user interface engine 214 to the user device 125a via signal line 104. In one embodiment, the communication unit 230 includes a port for direct physical connection to the network or to another communication channel. For example, the communication unit 230 includes a USB, SD, CAT-5 or similar port for wired communication with the network. In another embodiment, the communication unit 230 includes a wireless transceiver for exchanging data with the network, or with another communication channel, using one or more wireless communication methods, such as IEEE 802.11, IEEE 802.16, BLUETOOTH® or another suitable wireless communication method.

In yet another embodiment, the communication unit 230 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 230 includes a wired port and a wireless transceiver. The communication unit 230 also provides other conventional connections to the network for distribution of files and/or media objects using standard network protocols such as TCP/IP, HTTP, HTTPS and SMTP as will be understood to those skilled in the art.

Methods

Figure 5:
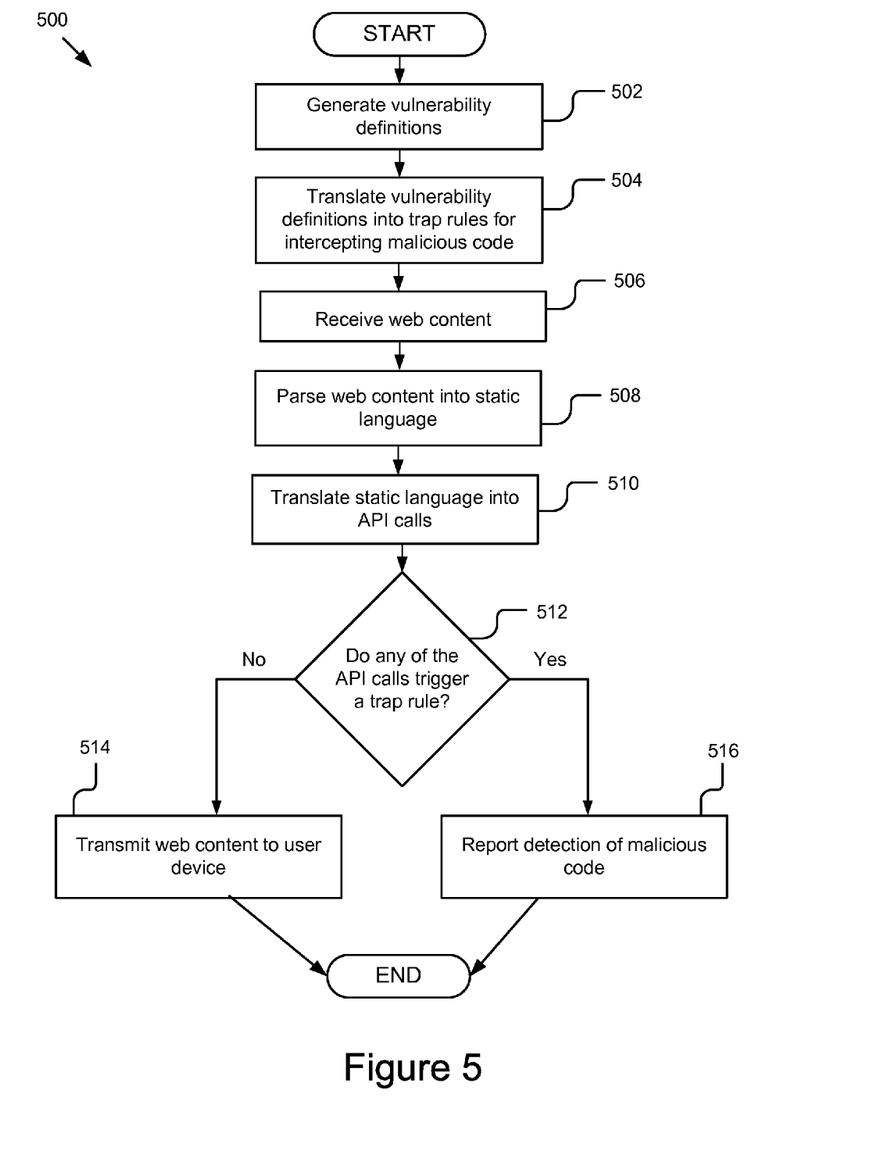
FIG. 5 is a flow diagram of a method for generating API calls from static code according to an embodiment of the invention.
Figure 6:
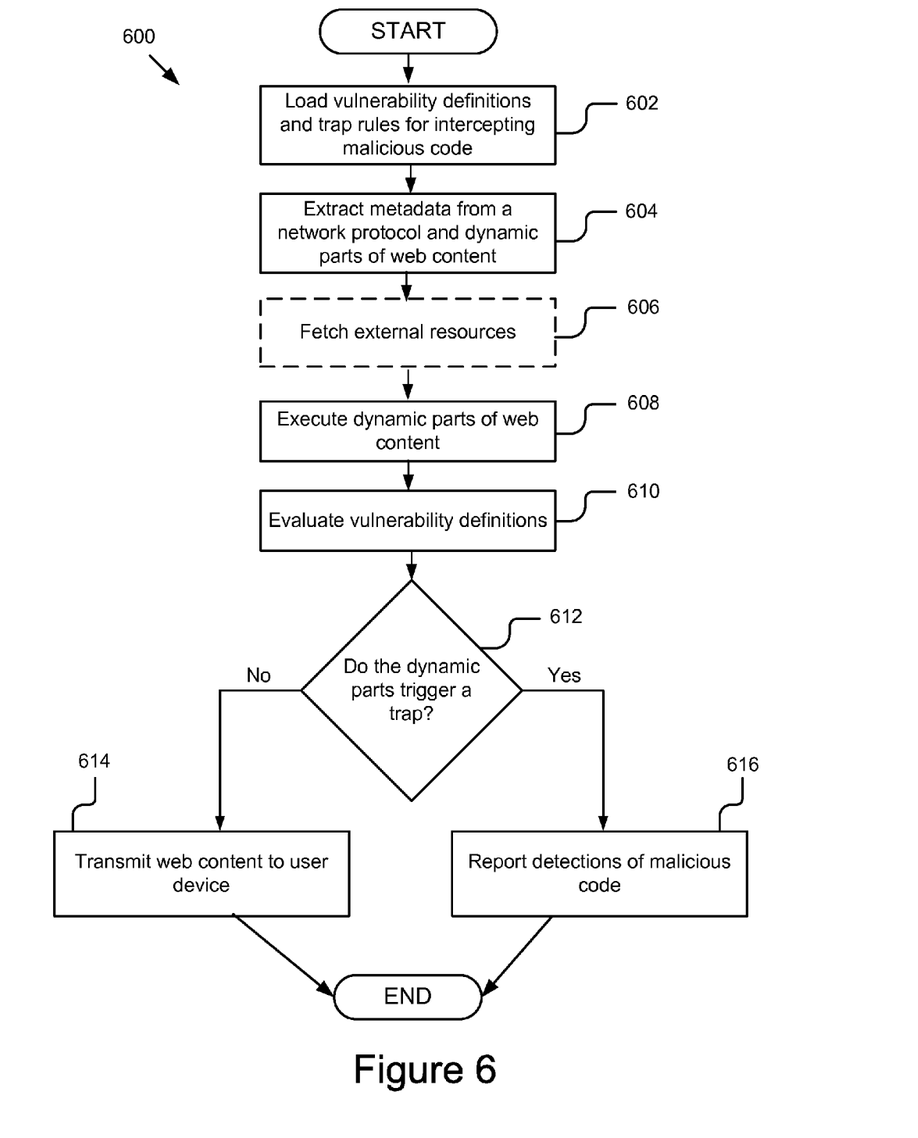
FIG. 6 is a flow diagram of a method for executing dynamic code in a sandbox according to an embodiment of the invention.

Referring now to FIGS. 5-6, various embodiments of the methods of the specification will be described. FIG. 5 is a flow diagram 500 for improving detection of malicious code using a content scanner 103 to translate parsed static language constructions into API calls and determine whether the API calls trigger a trap rule according to an embodiment of the invention. The vulnerability definition generator 204 generates 502 vulnerability definitions. These are derived from known issues within the security community and/or separate analysis performed by the vulnerability definition generator 204 on software. The vulnerability definitions 256 are transmitted to the translation engine 208, which translates 504 the vulnerability definitions into trap rules for intercepting malicious code. For example, a trap rule is triggered by the web content attempting to exploit one of the vulnerability definitions to gain access to the user device 125a and modify process files.

The controller 202 receives 506 web content via the communication unit 230 that originated at a web server 130a. The controller 202 transmits the web content to the parser 206, which parses 508 the web content into static language. In one embodiment, the parser 206 contains a separate parser for each type of language. The parser 206 transmits the static language to the translation engine 208, which translates 510 the static language into API calls 510. For example, the translation engine 208 translates HTML constructions into HTML DOM calls, which diminishes the difference between static constructions and dynamic parts of executable code.

The translation engine 208 determines 512 whether any of the API calls trigger a trap rule. If not, the controller 202 instructs the communication unit 230 to transmit 514 the web content to the user device 125a. If an API call triggers a trap rule, the controller 202 instructs the graphical user interface engine 214 to generate a notification regarding the malicious code. The controller 202 instructs the communication unit 230 to report 516 the detection of malicious code to the user. In one embodiment, the controller 202 refuses to transmit web content from a web server 130a that transmits malicious code. In another embodiment, the controller 202 transmits the web content to a repair module that removes the malicious code and rewrites the code.

FIG. 6 is a flow diagram 600 for using a content scanner 103 with a sandbox engine 208 to improve detection of malicious code according to one embodiment of the invention. In one embodiment, the flow diagram 600 applies to the same web content that is analyzed statically in FIG. 5. In another embodiment, the flow diagram 600 is an independent process for analyzing web content.

The sandbox engine 212 loads 602 vulnerability definitions and trap rules for intercepting malicious code. More specifically, the sandbox engine 212 includes a sandbox for each type of language, such as a JavaScript VM sandbox 406 and a VBScript VM sandbox 404 and so the vulnerability definitions and trap rules for each type of language are loaded into the different sandboxes. The sandbox engine 212 also includes an extractor 402 for extracting 604 the metadata from a network protocol associated with the browser 177 and dynamic parts of the web content. The metadata is used to simulate an application for displaying web content. For example, the extractor 402 extracts a user-agent header to identify the type of browser and version. The sandboxes receive the extracted metadata from the extractor 402.

In one embodiment, a fetcher 210 fetches 606 external resources for executing the web content. This only occurs if the web content has external resources that need to be executed, which depends upon the type of language used for generating the web content. For example, HTML frequently requires that the fetcher 210 fetch 606 external resources because it embeds JavaScript inside of the web page. Loading the external resources provides an additional method for simulating the environment of the browser and determining whether the web content contains malicious code that is activated by a combination of HTML and embedded JavaScript.

The sandbox engine 212 executes 608 the dynamic parts of the web content. The sandbox engine 212 then evaluates 610 the vulnerability definitions to determine 612 whether the dynamic parts of the web content trigger a trap rule. For example, the sandbox engine 212 determines whether the web content includes an API call or a data change that matches a vulnerability definition. If the web content does not trigger a trap rule, the controller 202 instructs the communication unit 230 to transmit 614 the web content to the user device 125a for rendering by the browser 177. If the web content does trigger a trap rule, the controller 202 instructs the graphical user interface engine 214 to generate a notification regarding the malicious code. The controller 202 instructs the communication unit 230 to report 616 the detection of malicious code to the user of the client device 125a.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method for detecting malicious code in web content received from a web server, the method comprising:
    loading an application interface (API) trap rule associated with a vulnerability definition into a simulator of a web browser to modify an API function of the web browser to intercept malicious code;
    extracting metadata from network protocol information associated with the web content;
    extracting a dynamic part of the web content;
    simulating, via the simulator, the web browser using the extracted metadata in a sandbox to execute the dynamic part of the web content;
    determining that the execution of the dynamic part of the web content includes an API call that triggers the API trap rule; and
    in response to the triggered API trap rule, monitoring execution of the associated API function in the simulator to identify a match with the vulnerability definition.

2. The computer-implemented method of claim 1, further comprising fetching an external resource.

3. The computer-implemented method of claim 2, wherein the external resource is at least one of a file written in JavaScript, Cascading Style Sheet (CSS) and HyperText Markup Language (HTML).

4. The computer-implemented method of claim 1, wherein the API call of the dynamic part includes a request for a data change.

5. The computer-implemented method of claim 1, further comprising, responsive to the API call of the dynamic part not triggering the API trap rule, transmitting the web content to a user device.

6. The computer-implemented method of claim 1, further comprising, responsive to the API call of the dynamic part triggering the API trap rule, reporting detection of the malicious code.

7. The computer-implemented method according to claim 1, wherein simulating a web browser in the sandbox comprises simulating a first portion of the dynamic part in a first sandbox when the first portion of the dynamic part is identified as a first type of content and simulating a second portion of the dynamic part in a second sandbox when the second portion is identified as a second type of content.

8. The computer-implemented method of claim 1, wherein the simulator comprises a plurality of language-specific sandbox virtual environments.

9. A system for detecting malicious code in web content comprising:
    an extractor to extract metadata from network protocol information associated with the web content and to extract a dynamic part of the web content; and
    a sandbox engine in communication with the extractor, the sandbox engine to:
        load an application programming interface (API) trap rule associated with a vulnerability definition into a simulator of a web browser to modify an API function of the web browser to intercept malicious code,
        simulate the web browser using the extracted metadata in a sandbox to execute the dynamic part of the web content; and
        determine that the execution of the dynamic part of the web content includes an API call that triggers the API trap rule; and
        in response to the triggered API trap rule, monitoring execution of the associated API function in the simulator to identify a match with the vulnerability definition.

10. The system of claim 9, wherein, responsive to the sandbox determining that the API call of the dynamic part does not trigger the API trap rule, the sandbox engine is to instruct a communication unit to transmit the web content to a user device.

11. The system of claim 9, wherein, in response to the determining that the API call of the dynamic part triggers the API trap rule, the sandbox engine is to instruct a graphical user interface to report detection of malicious code to a user.

12. The system of claim 9, further comprising a vulnerability definition generator to generate the vulnerability definition.

13. The system of claim 9, further comprising a fetcher to fetch external resources.

14. The system of claim 9, wherein the dynamic part comprises a request for a data change.

15. The system of claim 9, wherein the sandbox engine is to generate a plurality of language-specific sandbox virtual environments.

16. A tangible computer readable storage disc or storage device comprising instructions that, when executed, cause a machine to at least:
    load an application interface (API) trap rule associated with a vulnerability definition into a simulator of a web browser to modify an API function of the web browser to intercept malicious code;
    extract metadata from network protocol information associated with the web content;
    extracting a dynamic part of web content received from a web server;
    simulate, via the simulator, the web browser using the extracted metadata in a sandbox to execute the dynamic part of the web content;
    determine that the execution of the dynamic part of the web content includes an API call that triggers the API trap rule; and
    in response to the triggered API trap rule, monitoring execution of the associated API function in the simulator to identify a match with the vulnerability definition.

17. The tangible computer readable storage disc or storage device of claim 16, wherein the instructions further cause the machine to fetch an external resource.

18. The tangible computer readable storage disc or storage device of claim 16, wherein the instructions further cause the machine to, in response to the API call of the dynamic part triggering the API trap rule, reporting detection of the malicious code.

19. The tangible computer readable storage disc or storage device of claim 16, wherein the instructions further cause the machine to, in response to the API call of the dynamic part not triggering the API trap rule, transmitting the web content to a user device.

\* \* \* \* \*